US011025340B2

(12) United States Patent
Hashemi et al.

(10) Patent No.: US 11,025,340 B2
(45) Date of Patent: Jun. 1, 2021

(54) DARK FIBER DENSE WAVELENGTH DIVISION MULTIPLEXING SERVICE PATH DESIGN FOR MICROSERVICES FOR 5G OR OTHER NEXT GENERATION NETWORK

(71) Applicant: AT&T Intellectual Property I, L.P., Atlanta, GA (US)

(72) Inventors: Seyed Hashemi, Johns Creek, GA (US); Fariborz Farhan, Johns Creek, GA (US); Kumar Tamilmoni, Atlanta, GA (US); Michael O'Connor, Lakeville, MN (US); Taha Elkhatib, Buford, GA (US); Wei Yen, Atlanta, GA (US); Brian Horen, Littleton, CO (US); Veronica Gensamer, Alpharetta, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 56 days.

(21) Appl. No.: 16/212,972

(22) Filed: Dec. 7, 2018

(65) Prior Publication Data

US 2020/0186243 A1 Jun. 11, 2020

(51) Int. Cl.
*H04B 10/11* (2013.01)
*H04B 10/25* (2013.01)
(Continued)

(52) U.S. Cl.
CPC ............. *H04B 10/11* (2013.01); *H04B 10/25* (2013.01); *H04B 10/27* (2013.01); *H04J 14/0227* (2013.01)

(58) Field of Classification Search
CPC ..... H04W 84/12; H04W 88/12; H04W 24/02; H04W 8/18; H04W 16/14; H04W 16/18;
(Continued)

(56) References Cited

U.S. PATENT DOCUMENTS 6,744,984 B1 6/2004 Faruque et al.
6,748,171 B1 6/2004 Homayoun et al.
(Continued)

FOREIGN PATENT DOCUMENTS

CA 2304289 A1 10/2001
WO 03085543 A1 10/2003
(Continued)

OTHER PUBLICATIONS

Aguado, Marhuenda J., et al. "Experimental Demonstration of Policy-based Dynamic End-to-End Provisioning over Multi-Layer Network using SDN." European Conference in Optical Communications Tu. vol. 1. 2016.4 pages.
(Continued)

*Primary Examiner* — Natasha W Cosme
(74) *Attorney, Agent, or Firm* — Amin, Turocy & Watson, LLP

(57) ABSTRACT

A dark fiber dense wavelength division multiplexing service path design microservice (ddSPDmS) can provide a scalable self-contained meta-data driven approach for a flexible implementation of a dark fiber dense wavelength division multiplexing (DWDM) service path design solution. The service plan design solution can be used as a standalone solution or integrated with a network management application. In order to manage a large volume of circuit designs, multiple microservices can accept application program interface (API) requests in a cloud environment. Permission can then be given to any application to use the API to make a call to the design and inventory. Additionally, metadata templates can be designed to support a node, a link, and/or a topology for the microservices.

20 Claims, 12 Drawing Sheets

(51) Int. Cl.
*H04B 10/27* (2013.01)
*H04J 14/02* (2006.01)

(58) Field of Classification Search
CPC ............. H04W 28/0221; H04W 28/18; H04W 40/248; H04W 48/16; H04W 48/17; H04W 84/005; H04W 88/16; H04W 88/18; H04W 8/22; H04W 48/00; H04W 64/00

See application file for complete search history.

(56) References Cited

U.S. PATENT DOCUMENTS

| | | | |
|---|---|---|---|
| 6,816,642 | B1 | 11/2004 | Mayer et al. |
| 7,020,359 | B2 | 3/2006 | Mayer |
| 7,289,456 | B2 | 10/2007 | Gupta et al. |
| 7,826,397 | B2 | 11/2010 | Krishnaswamy et al. |
| 8,295,701 | B2 | 10/2012 | Gazzola et al. |
| 8,768,167 | B2 | 7/2014 | Tanna et al. |
| 8,830,989 | B2 | 9/2014 | Spraggs et al. |
| 8,942,558 | B2 | 1/2015 | Jenkins et al. |
| 9,485,550 | B2 | 11/2016 | Chhillar et al. |
| 9,838,111 | B2 | 12/2017 | Schmidtke et al. |
| 9,847,838 | B2 | 12/2017 | Ward |
| 9,942,099 | B2 | 4/2018 | Aldrin |
| 10,148,506 | B1* | 12/2018 | Anburose ........... H04L 41/5006 |
| 2004/0028317 | A1 | 2/2004 | Mclean |
| 2016/0080243 | A1* | 3/2016 | Kodama ............. H04L 41/0806 370/252 |
| 2017/0075849 | A1* | 3/2017 | Lavoie ................. H04B 10/40 |
| 2017/0093750 | A1* | 3/2017 | McBride ............. H04L 47/805 |

FOREIGN PATENT DOCUMENTS

| | | |
|---|---|---|
| WO | 2016198961 A2 | 2/2017 |
| WO | 2018055042 A1 | 3/2018 |
| WO | 2018136964 A1 | 7/2018 |

OTHER PUBLICATIONS

Figueira, S., et al. "DWDM-RAM: Enabling Grid Services with Dynamic Optical Networks." Cluster Computing and the Grid, 2004. CCGrid 2004. IEEE International Symposium on. IEEE, 2004. 8 pages.

Smarr, Larry L. "The Optiputer." Cluster Computing and the Grid, 2004. CCGrid 2004. IEEE International Symposium on. IEEE, 2004. 10 pages.

Izquierdo-Zaragoza, Jose-Luis, et al. "Leveraging Net2Plan planning tool for network orchestration in OpenDaylight." Smart Communications in Network Technologies (SaCoNeT), 2014 International Conference, IEEE, 2014. 6 pages.

Alwayn, Vivek. "Optical Network Design and Implementation." Cisco Press Mar. 27, 2004. 757 pages.

Chen, Wen-Ping, et al. "The Multiple Path Protection of DWDM Backbone Optical Networks." Journal of Information Science and Engineering 25, 733-745 (2009). 13 pages.

* cited by examiner

DARK FIBER DENSE WAVELENGTH DIVISION MULTIPLEXING SERVICE PATH DESIGN FOR MICROSERVICES FOR 5G OR OTHER NEXT GENERATION NETWORK

TECHNICAL FIELD

This disclosure relates generally to facilitating dark fiber wavelength division multiplexing. For example, this disclosure relates to facilitating dark fiber wavelength division multiplexing service path design for microservices for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

Microservices are an example of a software architectural style in which large applications are composed from small loosely coupled services with independent lifecycles. Microservice architecture evolved from the managing of complex monolithic style applications that are built as a single unit. The entire application is packaged into a single web application archive (WAR) or enterprise application archive (EAR). As the application grows and becomes more complex, complications arise. A change to one part of the application may require that the entire application be rebuilt, retested, packaged, and deployed. Another concern is that parts of the application may scale differently than others, thus prompting the entire application to be scaled in effect according to a lowest common denominator.

The above-described background relating to a service path design for microservices is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
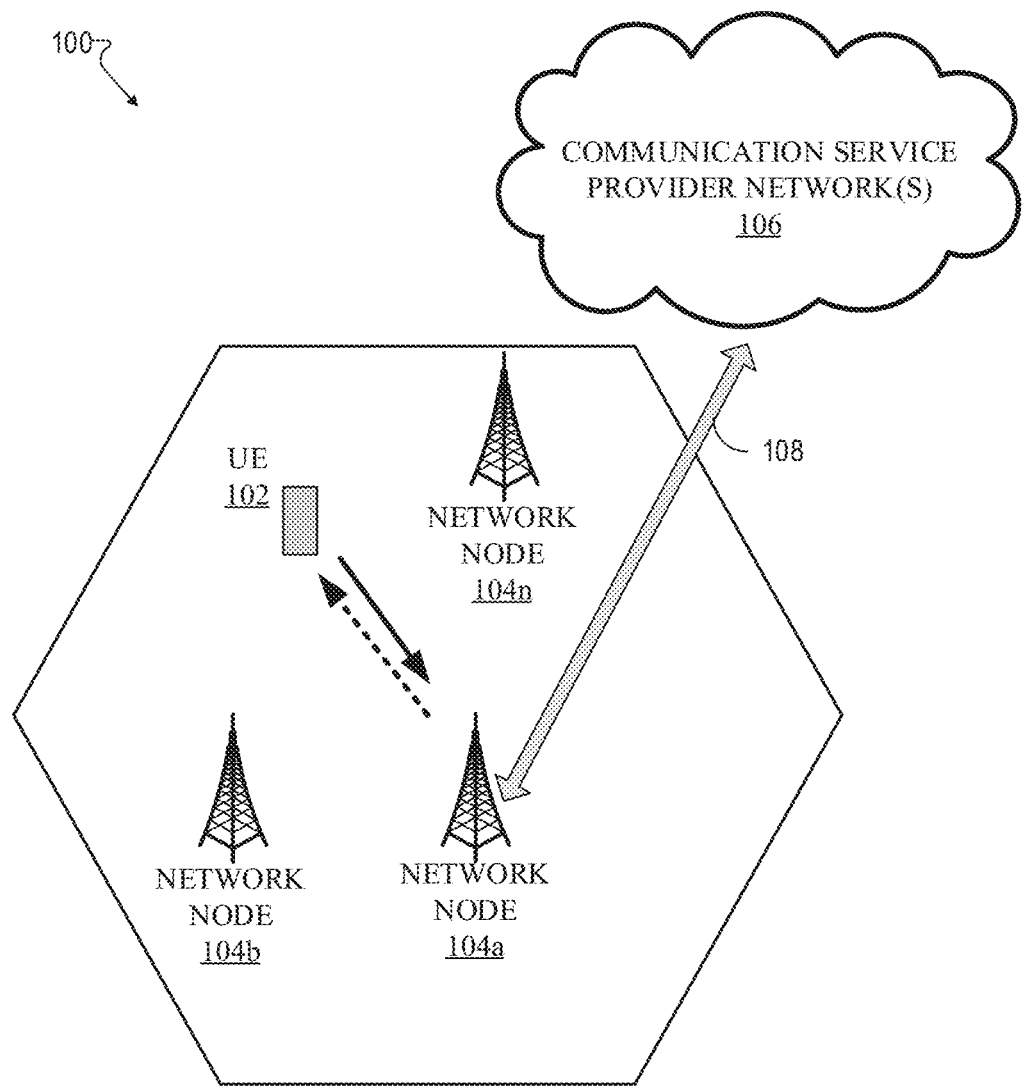
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate dark fiber wavelength division multiplexing service path design for microservices for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate dark fiber wavelength division multiplexing service path design for microservices for a 5G network. Facilitating a dark fiber wavelength division multiplexing service path design for microservices for a 5G network can be implemented in connection with any type of device with a connection to the communications network (e.g., a mobile handset, a computer, a handheld device, etc.) any Internet of things (JOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

The microservice architectural style composes applications from separate, independent services that provide a single domain capability. This allows parts of the application to be changed and evolve over time without impacting other parts of the application. Microservices are designed to be independently developed, tested, deployed, configured, upgraded, scaled, monitored, and administered. In particular, independent deployment is a fundamental capability. Microservices can be standalone executable processes that cannot be deployed within application servers alongside other services. Microservices can hide implementation details, thus insulating microservice consumers from changes within or downstream from the services they consume.

As part of encapsulation, microservices can keep persistent data private to the service and accessible only via its application program interface (API). Thus, microservices cannot integrate at the data layer nor share the same database or database schema with other services. Additionally, automation of microservices can apply to all aspects of a microservices. Automation embraces development operations, continuous integration, and delivery processes including, but not limited to: automated testing, automated deployment, automated scaling, zero-touch rolling upgrades and/or downgrades, etc. □

A dark fiber dense wavelength division multiplexing service path design microservice (ddSPDmS) can provide a scalable self-contained meta-data driven approach for a flexible implementation of a dark fiber dense wavelength division multiplexing (DWDM) service path design solution. The design solution can be used as a standalone solution or integrated with a network management application. In order to put light on a dark fiber, the dark fiber can be connected to network equipment based on a layer. The fiber can be connected to a service switching port (SSP) to get the light to transmit the signal over a channel. The signal can be multiplexed (Mux) on one side and then demultiplexed (deMux) on the other side to get the needed signal. In order to manage a large volume of circuit design and build the circuit design into an inventory database, multiple micro services can accept application program interface (API) requests exposed by the microservice in a cloud environment. Permission can then be given to any application to use the API to make a call to the design and inventory database to use the microservice at a later time. A metadata template can be designed to support a node, a link, and/or a topology for a service.

Increased MIMO for LTE advanced (LTE-A) and 5G massive MIMO design can require a higher transport link capacity in addition to a low latency transport that can have less transport overhead. Ethernet to a cell site may not be an economical choice for the high-speed links. In some scenarios such as with remote cell sites, Ethernet to a cell site may not meet the 5G low latency use cases. Centralized radio access network (cRAN) deployment in hub offices with remote baseband unit (BBU) pooling and remote radio head (RRH— network densification) can require fiber transport with channelization (dense wavelength division multiplexing (DWDM)—reduce the fiber costs) for backhaul, shorthaul and/or fronthaul. To meet the demand of higher capacity links with low cost, mobile operators can utilize dark fiber powered by DWDM devices to connect and aggregate radio access network (RAN) traffic into a mobile transport switching office. Automated design of service path with various topology of dark fiber and DWDM devices can utilize a cloud-based, self-contained, and meta-data driven approach for a low cost and fast time to market solutions.

The ddSPD micro service can provide various templates to support the data model such as: a node template, a link template, and/or a rule template. The ddSPD micro service can also automate the design service path topologies such as: ring, point-to-point and hub-spoke. Additionally, the ddSPD micro service can also provide representational state transfer (REST) application program interfaces (API) with standard meta-data such as javascript object notation (JSON) for integration flexibility to support new use cases. RESTful (JSON)APIs can support the service path APIs for various components and system integration per supported use case in the topology templates. A device template can define nodes per topology and device components such as: slots, chassis, cards, ports, small form-factor pluggabletransceiver (SFPs), multiplexers, demultiplexers, transponders, etc. The aforementioned device components can be cached from an inventory data model. A rules template can define business rules on the connectivity of the links, cables, device service modules such as jumpers, and fiber for a service path topology. Additionally, a link template can define physical and/or logical connection end points per topology template.

The topology template can define the topology use cases that the microservice can support for the service path, such as: point-to-point, hub-spoke, ring. It can also define a micro flow to create the design. Additionally, the topology template can support multi-link segments such as a wavelength path within a service path. The micro flow can provide sequencing for the topology template to design the service path. This can be a cross-platform javascript run-time environment (NodeJS) sequencing or other comparable technology for micro flow sequencing. Additionally, database management systems (DBMS) (e.g., MariaDB) can be leveraged for the micro service to store the meta-data, logic, and service path design for the macro orchestration flow life cycle or optionally as a service path in a stand-alone deployment. Furthermore, an inventory (INV) API/DBMS driver can provide API or DBMS driver functions to cache the device data, service path from the inventory, and/or update the design into inventory. A graphical user interface (GUI) (e.g., internal or external) can display the designed service path and templates to a user to provide the user with edit capabilities. The GUI can use the same RESTful API provided by the microservice. For example, a standard web browser can be used with JSON to display API responses. Thus, micro service solutions can provide a cloud-based, self-contained code that provides easy instantiations for scale and ease of integration with a network management application orchestration and inventory database. It should be noted that this micro service meta-data driven solution is not limited to automation of DWDM service path. Other mobile backhaul solution use cases, such as switched Ethernet and dedicated Ethernet, can also be included.

In one embodiment, described herein is a method comprising receiving, by a wireless network device comprising a processor, first orchestration flow data representative of a first service flow of a service of a wireless network. The method can also comprise applying, by the wireless network device, topology template data, representative of a topology, to the first orchestration flow data, wherein the topology template data comprises device template data representative of a node device associated with the topology, and rules template data representative of a connectivity rule associated with a service path topology. Additionally, the method can comprise in response to the applying the topology template data to the first orchestration flow data, generating, by the wireless network device, second orchestration flow data representative of a second service flow of the service of the wireless network.

According to another embodiment, a system can facilitate, receiving first orchestration flow data representative of a macro service flow of a service of a wireless network. The system can also facilitate applying topology template data, representative of a topology, to the macro service flow, wherein the topology template data comprises device template data representative of a node device associated with the topology, and link template data representative of an endpoint connection. Furthermore, the system can comprise generating second orchestration flow data representative of a micro service flow of the service of the wireless network in response to the applying the topology template data to the macro service flow.

According to yet another embodiment, described herein is a machine-readable storage medium that can perform the operations comprising receiving first orchestration flow data representative of a first service flow. The machine-readable storage medium can perform the operations comprising applying a topology template associated with a second service flow, to the first service flow, wherein the topology template comprises rules template data representative of a connectivity rule associated with the second service flow, and link template data representative of an endpoint connection within the topology template. Additionally, the machine-readable storage medium can perform the operations comprising generating second orchestration flow data representative of the second service flow in response to the applying the topology template to the first service flow.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
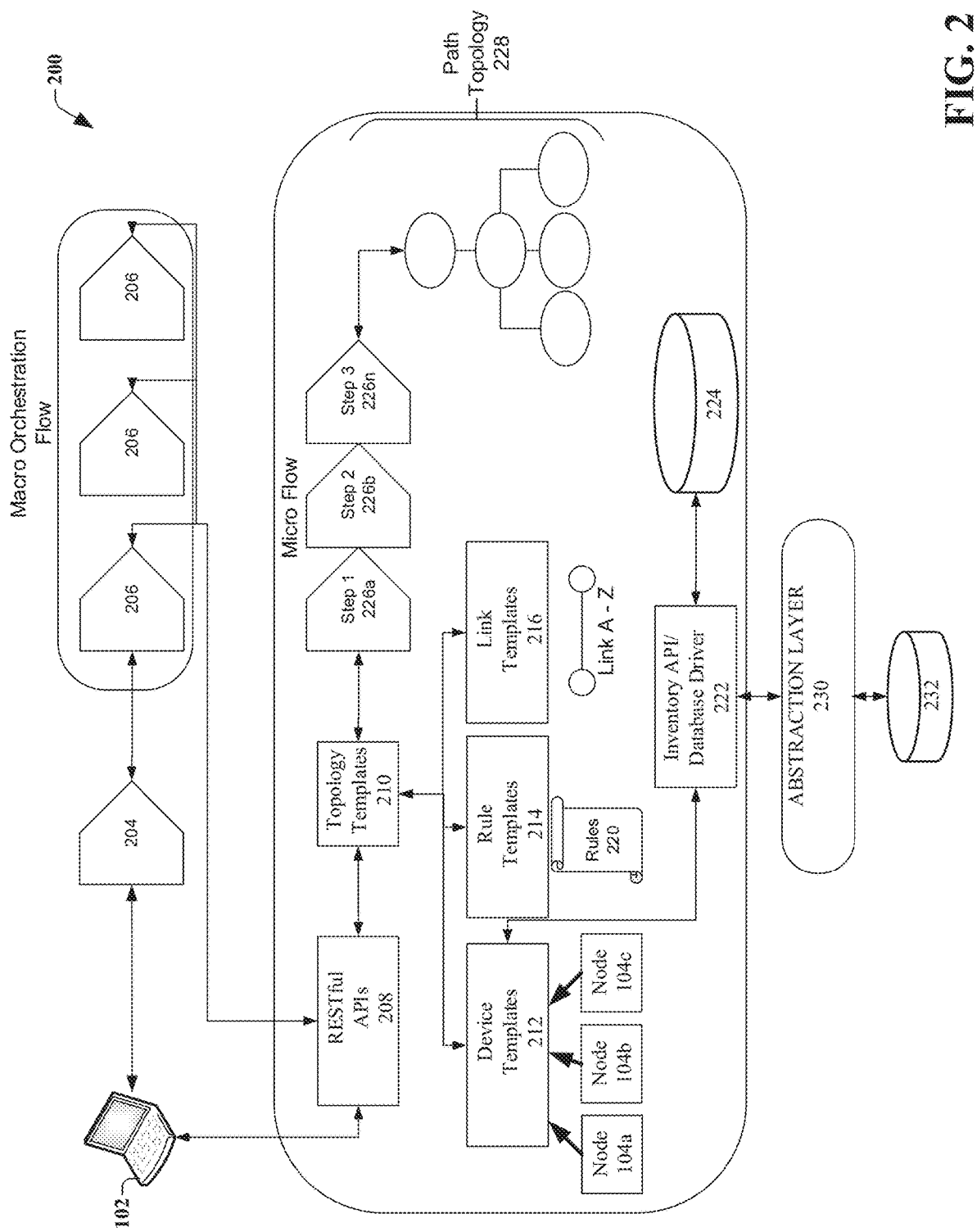
FIG. 2 illustrates an example schematic system block diagram of a service path design according to one or more embodiments.

Referring now to FIG. 2, illustrated is an example schematic system block diagram 200 of a service path design according to one or more embodiments. A macro orchestration workflow can be a service provider system that comprise work orders 206. The work orders for automated task activities can include, but are not limited to a request received date (RRD) auto inventory function, a path design final (PDF)) auto inventory function, and/or an in-service date (ISD) auto status (e.g., active) change function. The GUI (e.g., mobile device 102) can use the RESTful API 208, by utilizing an order microservices function 204, to inject a command or the workflow. The RESTful API 208 can instantiate a service template, commit a service path design, and/or fetch the service path, within the microservices platform, by communicating with a topology template 210. Thus, the GUI can utilize the RESTful API 208 to create a service path and build it into an internal inventory database 224.

The topology template 210 can define the use cases for which the system can support by supporting a micro low to build links. To build a link, the microflow can determine if there is a port on a network device 104 so that a link (e.g., jumper, fiber, segment, etc.) can be placed on the port. Then the system 200 can determine if resources on the other end of the link are available. Thereafter, sequencing can be used to place multiple links together to create a path for a service for the network device 104. Thus, the macroflow can inform the topology template 210 to build the microflow, wherein the microflow can also take into account additional data from various templates. The templates can comprise a device template 212, a rule template 214, and/or a link template 216. It should be noted that in one or more embodiments, more or less templates can be included within the system 200. The templates can also be stored in an internal database 224 and/or external database 232 connected to the system via an abstraction layer 230. The abstraction layer can communicate with an inventory API/database driver 222, wherein the inventory API/database driver 222 can cache the network device 104 data (e.g., from the device template 212), service path from the inventory, and/or update the design into inventory. Any API call to the microservice can then use any of the stored the designs. Data can also be cached and purged based on other system rules. Although the GUI can be used to design and test the microservices, it should be noted that in other embodiments, the GUI 102 cannot be connected to the system.

The device template 212 comprises detailed mobile device 102 information and can define a device (e.g., node 104a, node 104b, node 104c) and its components with respect to a specific topology. For example, a specific type of network device 104 can comprise slots, cards, ports, SFPs, Mux, DeMux, transponders, etc. The network device 104 type can be communicated from the node 104a, 104b, 104c to the device temple 212. This data can then be communicated to the topology template 210.

Rules 220 of the rules template 214 can be communicated to the topology template 210. Rules can be associated with a backhaul, a common public radio interface (CPRI)/fronthaul, and/or shorthaul. For instance, rules can be used to allow a port on one network device 104 to be connected to another port on another network device. Rules can be defined in terms of how to connect links (from the link template 216), cables, jumpers, fiber fidelity, wavelengths, etc. between network devices 104. For example, if there is a fiber connection, then a rule can mandate that the fiber connection be on the com port for the network device 104. In another example, if the system is transmitting a signal from network device 104 A to network device 104C, via network device 104B, then a rule can mandate that the signal be regenerated at network device 104B for transmission to network device 104 C. In yet another example, a rule can mandate that a fiber connected to a specific port can regenerate signals to pass data on specific wavelengths or switch wavelengths. Thus, in order to add add/drop a frequency of the wavelength, there can be a transmission line and a reception line using redundant connectivity for macro cell sites.

The link template 216 can comprise physical connections (e.g., fibers) and logical connections (e.g., wavelengths) and how the connections are routed from point A to point Z. The link template 216 can determine which links are being supported. For example, to connect one DWDM device (e.g., network device 104) to another DWDM device, the fiber between the two can be connected. Sequencing can be used to build links and connect those links to a physical fiber or channelize the fiber to a wavelength. In order to create an end-to-end connectivity, the fiber can be connected to the DWDM devices, and then the fiber can be channelized with a specific wavelength. Channelizing the fiber comprises breaking down a frequency from one point to another point. Noting that a wavelength can change as it travels over different network segments, the system 200 can be designed to account for a decrease and/or increase in frequency by channelizing the fiber. Thus, based on whether the frequency was decreased and/or increased, the wavelength can change so that a path can be created to transmit data from one endpoint to another endpoint. The device template 212, rules template 214, and/or the link template 216 can communicate their data to the topology template 210. The data received by the topology template 210, can then be used to generate steps 226(a, b, c) of the microflow to generate a path topology 228. It should be noted that one or more embodiments can contain some or all of the aforementioned templates.

Figure 3:
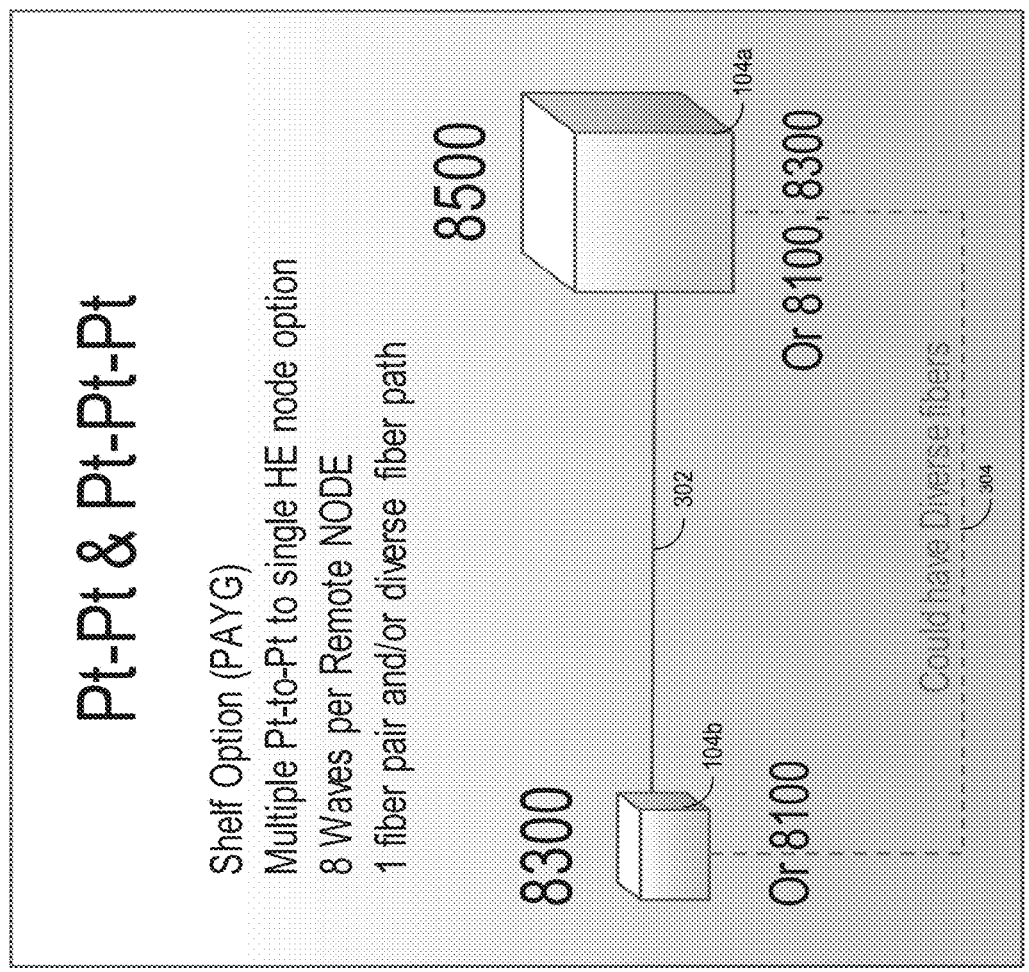
FIG. 3 illustrates an example schematic system block diagram of point-to-point service path according to one or more embodiments.

Referring now to FIG. 3, illustrated is an example schematic system block diagram of point-to-point service path 300 according to one or more embodiments. As depicted in FIG. 3, a network node 104a can have a direct point-to-point connection to another network node 104b via a fiber pair 302, and/or the network node 1042a can also have a diverse fiber connection 304 for a lower frequency to network node 104b.

Figure 4:
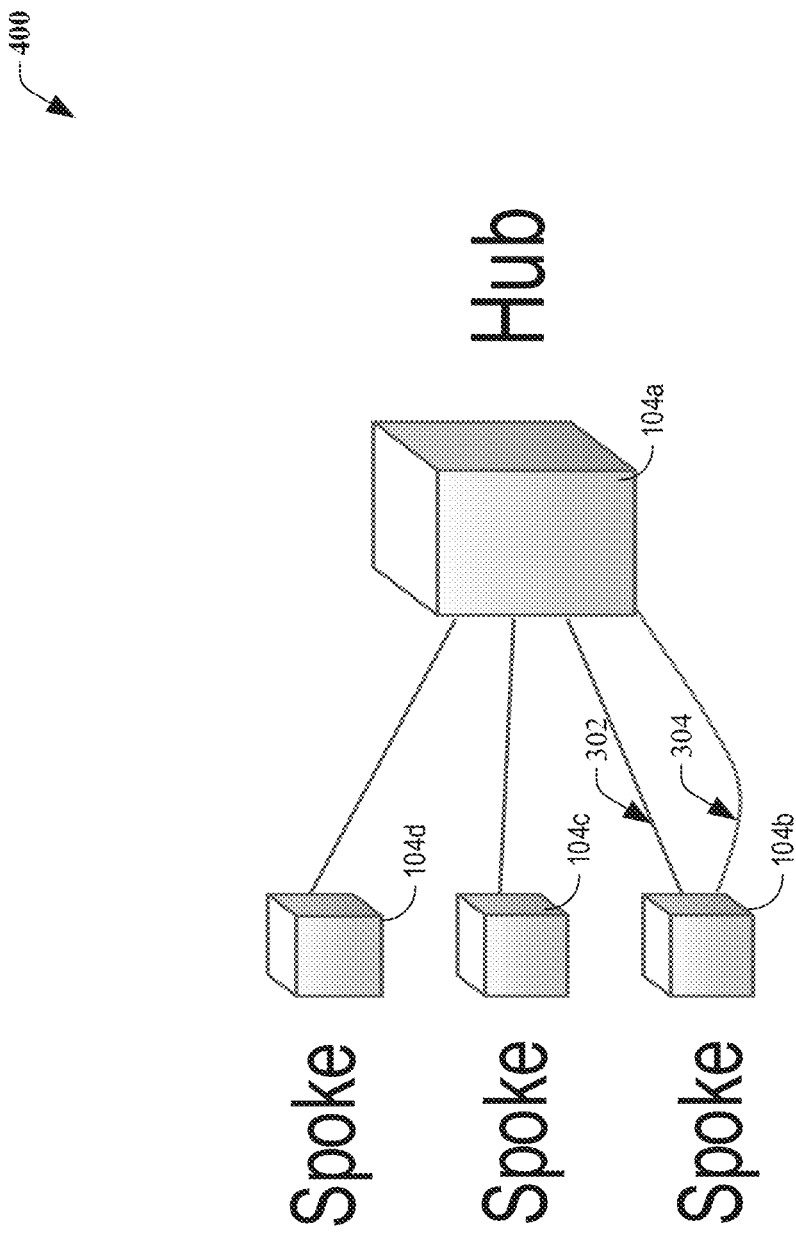
FIG. 4 illustrates an example schematic system block diagram of a hub service path according to one or more embodiments.

Referring now to FIG. 4, illustrated is an example schematic system block diagram of a hub service path 400 according to one or more embodiments. The hub service path can have one network node 104a communicating with several network nodes 104b, 104c, 104d (e.g., spoke) over several links. For example, the network node 104a can communicate with the network node 104d over a different connection than the network node 104a communicates with the network node 104c. It should also be noted that as in FIG. 3, the network node 1042b can have a fiber pair 302 and a diverse fiber connection 304 to the network node 104a. This should be considered a non-limiting embodiment in that any number of the network nodes 104b, 104c, 104d (e.g., spoke) can be capable of communicating with the mobile device 102a over a fiber pair and/or a diverse fiber connection.

Figure 5:
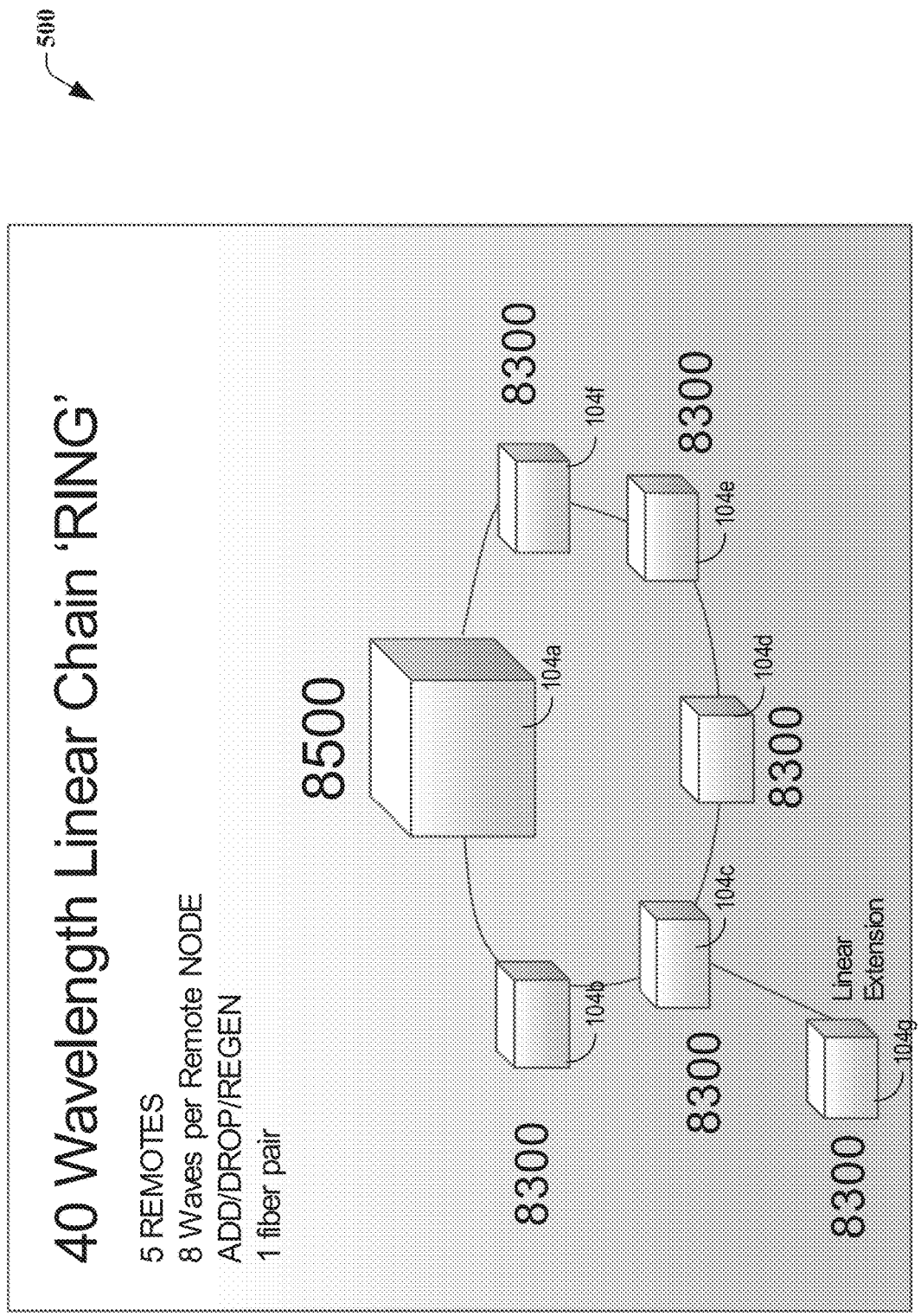
FIG. 5 illustrates an example schematic system block diagram of a ring service path according to one or more embodiments.

Referring now to FIG. 5 illustrates an example schematic system block diagram of a ring service path 500 according to one or more embodiments. The ring service path 500 can comprise remote network nodes 104b, 104c, 104d, 104e, 104f with a linear extension connection between the network node 104c and 104g. The remote network nodes 104b, 104c, 104d, 104e, 104f can each have a linear connection between itself and its neighboring mobile devices. For instance, the network node 104c can have a point-to-point connection with the network node 104b and another point-to-point connection with the network node 104d. The ring can be formed based on a connection beginning with the network node 104a and another connection ending with the network node 104a, thus forming the ring.

Figure 6:
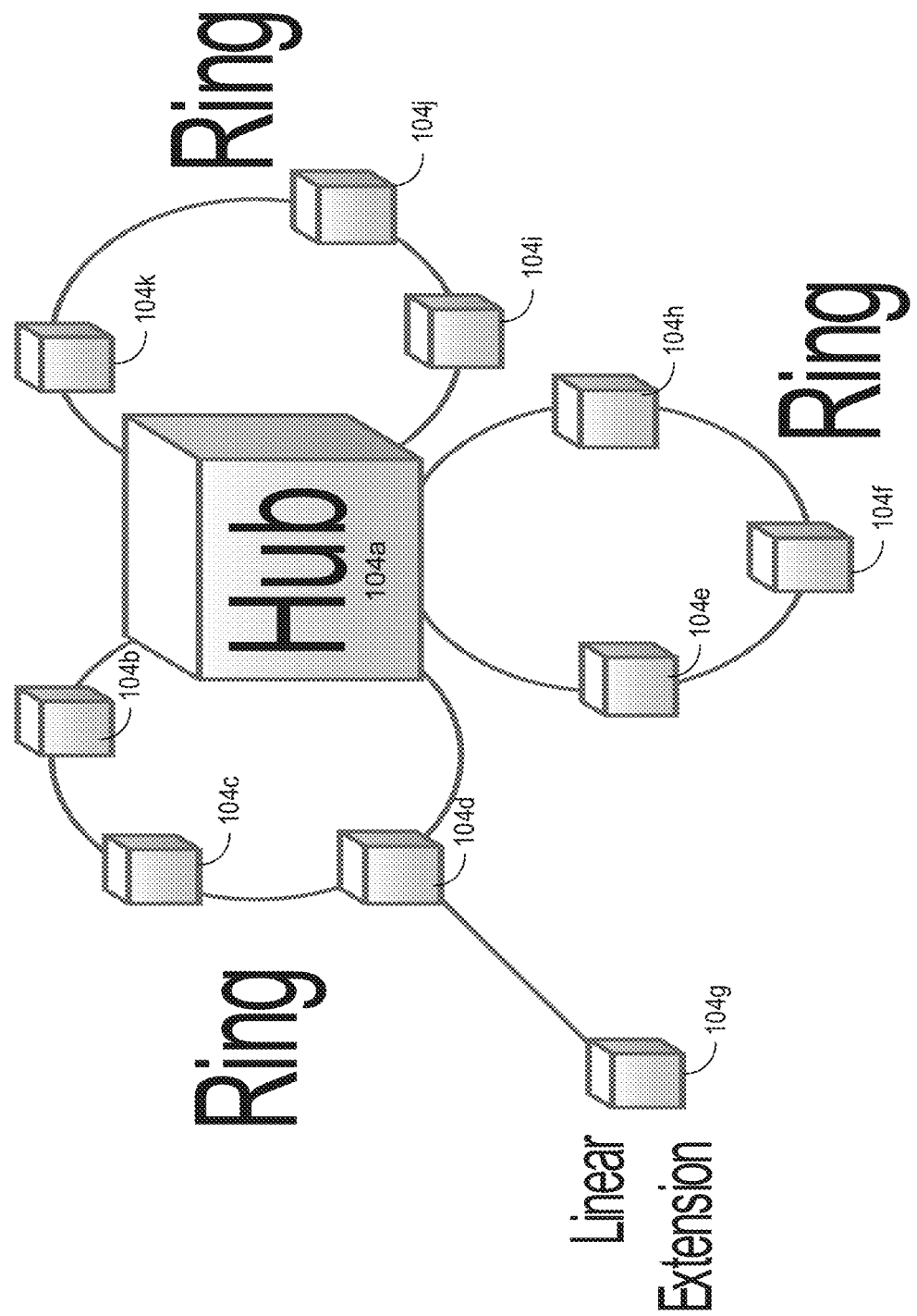
FIG. 6 illustrates an example schematic system block diagram of combined service paths according to one or more embodiments.

Referring now to FIG. 6, illustrated is an example schematic system block diagram of combined service paths 600 according to one or more embodiments. The depicted combined service paths 600 can comprise a point-to-point service path as represented between the remote network node 104b, 104c, 104d, 104e, 104f, 104g, 104h, 104i, 104j, 104k. However, the remote mobile devices 104b, 104c, 104d, 104e, 104f, 104g, 104h, 104i, 104j, 104k can form several rings around the hub mobile device 104a. Thus, as opposed to the one ring depicted in FIG. 5, several rings are possible with respect to FIG. 6.

Figure 7:
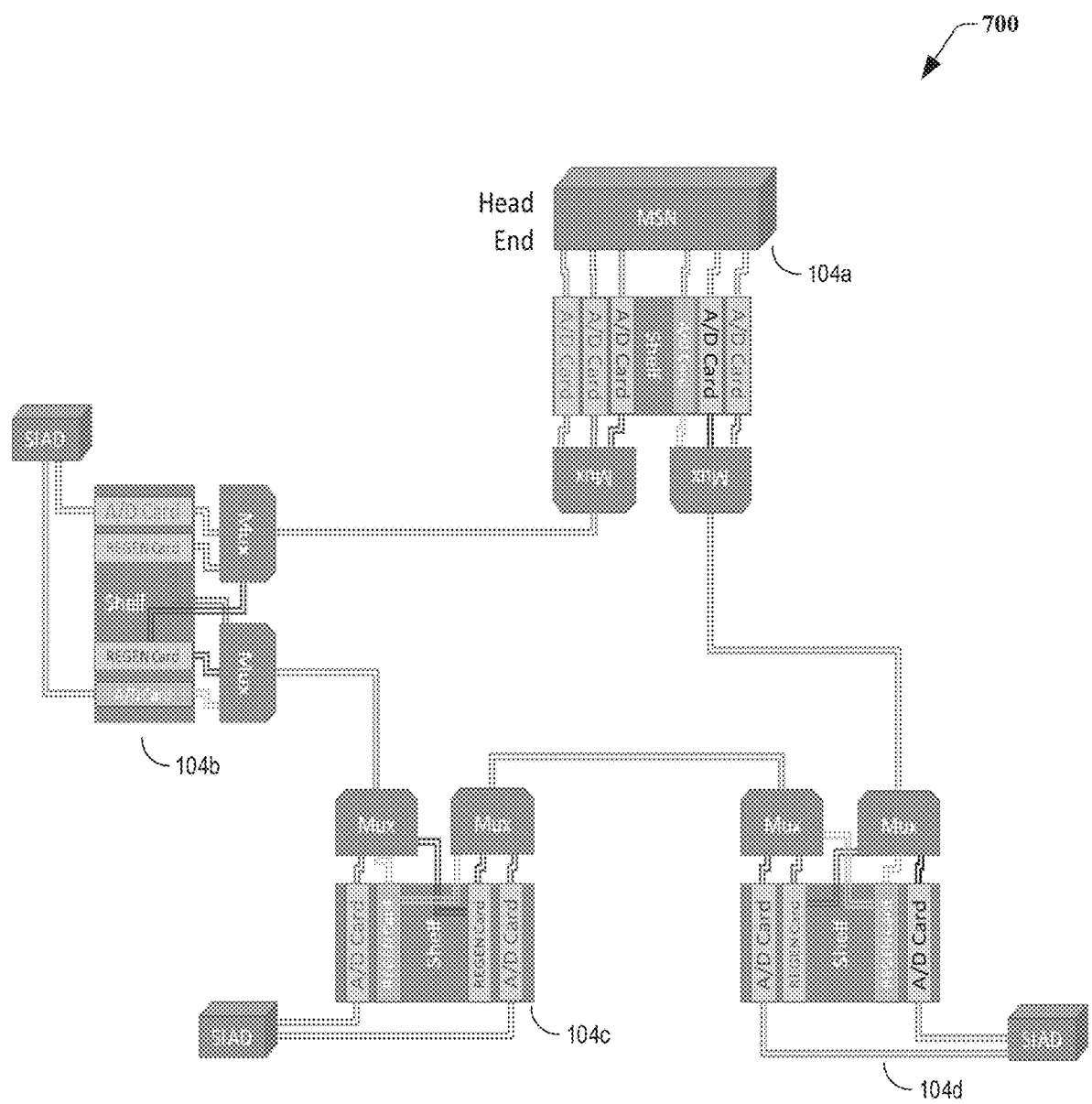
FIG. 7 illustrates an example schematic system block diagram of a ring routing option according to one or more embodiments.

Referring now to FIG. 7, illustrated is an example schematic system block diagram of a ring routing option 700 according to one or more embodiments. For example, a head/end network node 104a can communicate with a remote network node 104b via a fiber pair connection after a rule for the fiber is set. For example, a rule can tell the head/end network node 104a what port to connect the fiber to on the remote network node 104b. The A/D card from the head/end network node 104a can connect to network node 104b to provide connectivity to the macro cell site. Thus, the signal can be regenerated at the network node 104b to pass wavelength data via a signal to the network node 104c. In order for the add/drop at the network node 104c there can be 2 lines at the SIAD to facilitate redundant connectivity for the cell site. Therefore, one line can be for transmissions and the other line can be for reception. The Mux/DeMux can be pluggable modules designed for a capacity needed for the links. Thus, the device template can have the details of the shelf, the cards, and the Mux that can be used to facilitate the transmissions. The remote network node 104b can communicate with another remote network node 104c via another fiber pair connection. The remote network node 104c can then communicate with the hub network node 104a via yet another fiber pair connection, thus creating a ring service path.

Figure 8:
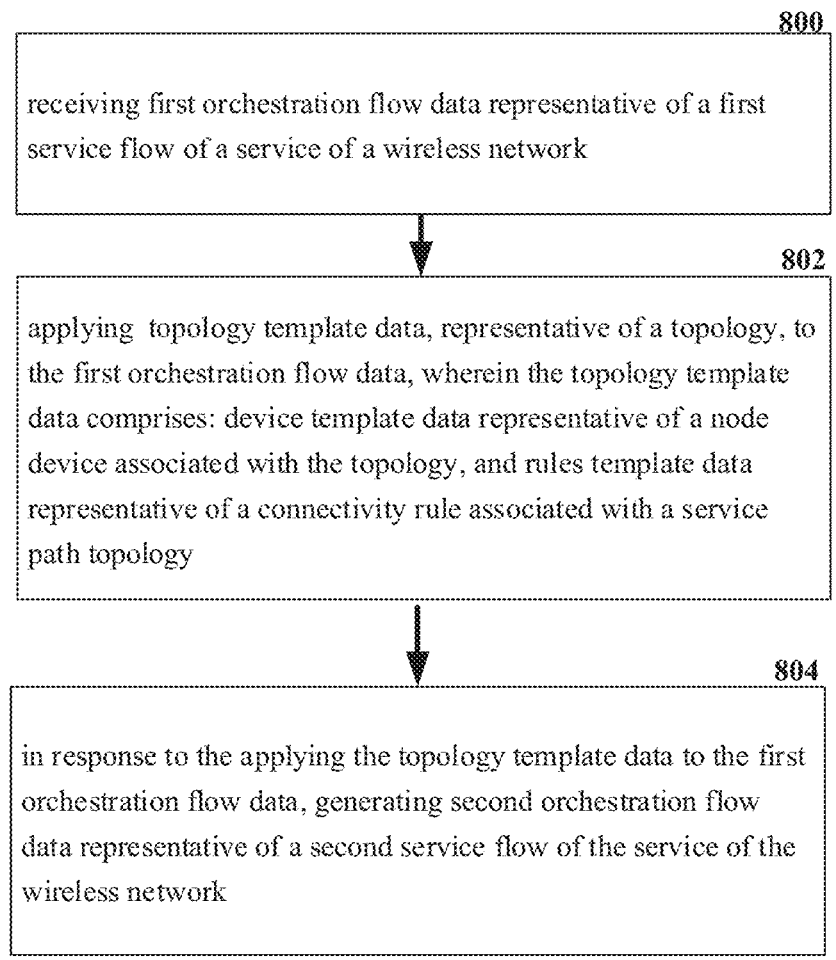
FIG. 8 illustrates an example flow diagram for a method for a service path design network according to one or more embodiments.

Referring now to FIG. 8, illustrated is an example flow diagram for a method for a service path design network according to one or more embodiments. At element 800 a method can comprise receiving (by a node device 104) first orchestration flow data representative of a first service flow (e.g., work orders 206) of a service of a wireless network. At element 802, the method can also comprise applying (by a node device 104) topology template data (from the topology template 210), representative of a topology, to the first orchestration flow data (e.g., work orders 206), wherein the topology template data comprises device template data (from the device templates 212) representative of a node device 104 associated with the topology, and applying (by a node device 104) rules template data (from the rules template 214) representative of a connectivity rule associated with a service path topology (e.g., path topology 22). Additionally, the method can comprise, in response to the applying the topology template data (from the topology template 210) to the first orchestration flow data (e.g., work orders 206), generating (by a node device 104) second orchestration flow data representative of a second service flow (e.g., steps 226) of the service of the wireless network at element 804.

Figure 9:
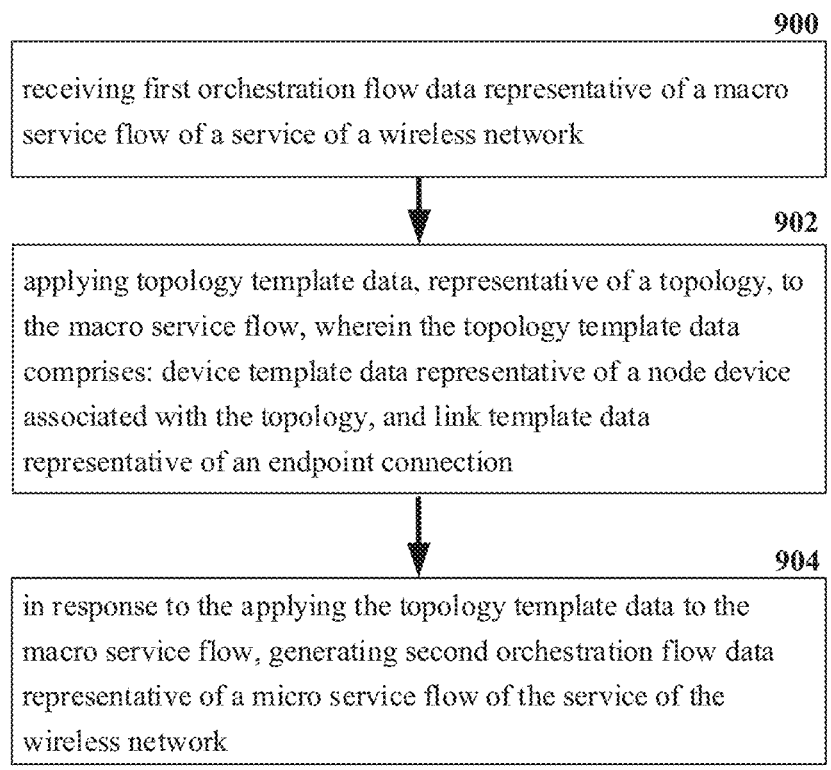
FIG. 9 illustrates an example flow diagram for a system for a service path design network according to one or more embodiments.

Referring now to FIG. 9, illustrates an example flow diagram for a system for a service path design network according to one or more embodiments. A system can facilitate, receiving (by a node device 104) first orchestration flow data (e.g., work orders 206) representative of a macro service flow of a service of a wireless network at element 900. At element 902, the system can also facilitate applying (by a node device 104) topology template data (from topology templates 210), representative of a topology, to the macro service flow (e.g., work orders 206), wherein the topology template data comprises device template data (e.g., device templates 212) representative of a node device 104 associated with the topology, and link template data (from link templates 216) representative of an endpoint connection. Furthermore, at element 904, the system can comprise generating (by the node device 104) second orchestration flow data representative of a micro service flow (e.g., steps 226) of the service of the wireless network in response to the applying the topology template data to the macro service flow.

Figure 10:
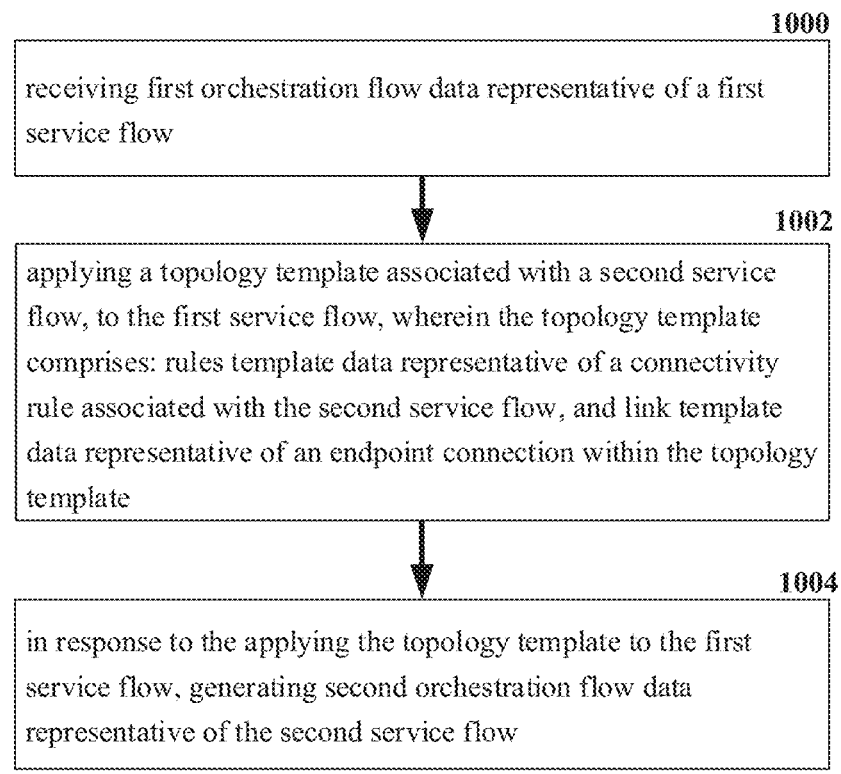
FIG. 10 illustrates an example flow diagram for a machine-readable medium for a service path design network according to one or more embodiments.

Referring now to FIG. 10, illustrated is an example flow diagram for a machine-readable medium for a service path design network according to one or more embodiments. At element 1000 a machine-readable storage medium can perform the operations comprising receiving (via the node device 104) first orchestration flow data representative of a first service flow (e.g., work orders 206). At element 1002, the machine-readable storage medium can perform the operations comprising applying (via the network node device 104) a topology template (from topology templates 210) associated with a second service flow (e.g., steps 226), to the first service flow (e.g., work orders 206), wherein the topology template comprises rules template data (from the rules template 214) representative of a connectivity rule associated with the second service flow (e.g., steps 226), and link template data (from link templates 216) representative of an endpoint connection within the topology template 210. Additionally, at element 1004, the machine-readable storage medium can perform the operations comprising generating (via the network node device 104) second orchestration flow data representative of the second service flow (e.g., steps 226) in response to the applying the topology 210 template to the first service flow (e.g., work orders 206).

Figure 11:
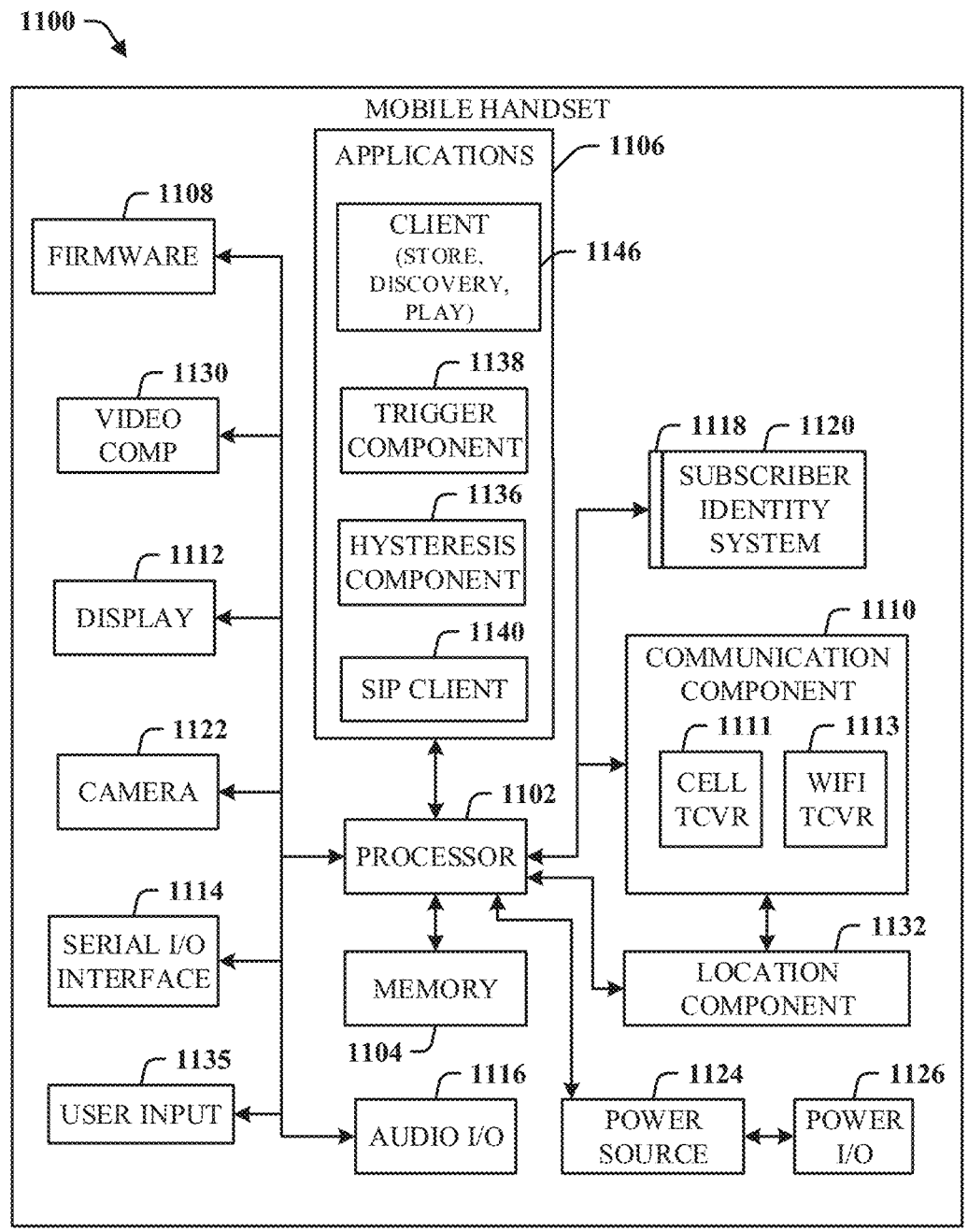
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
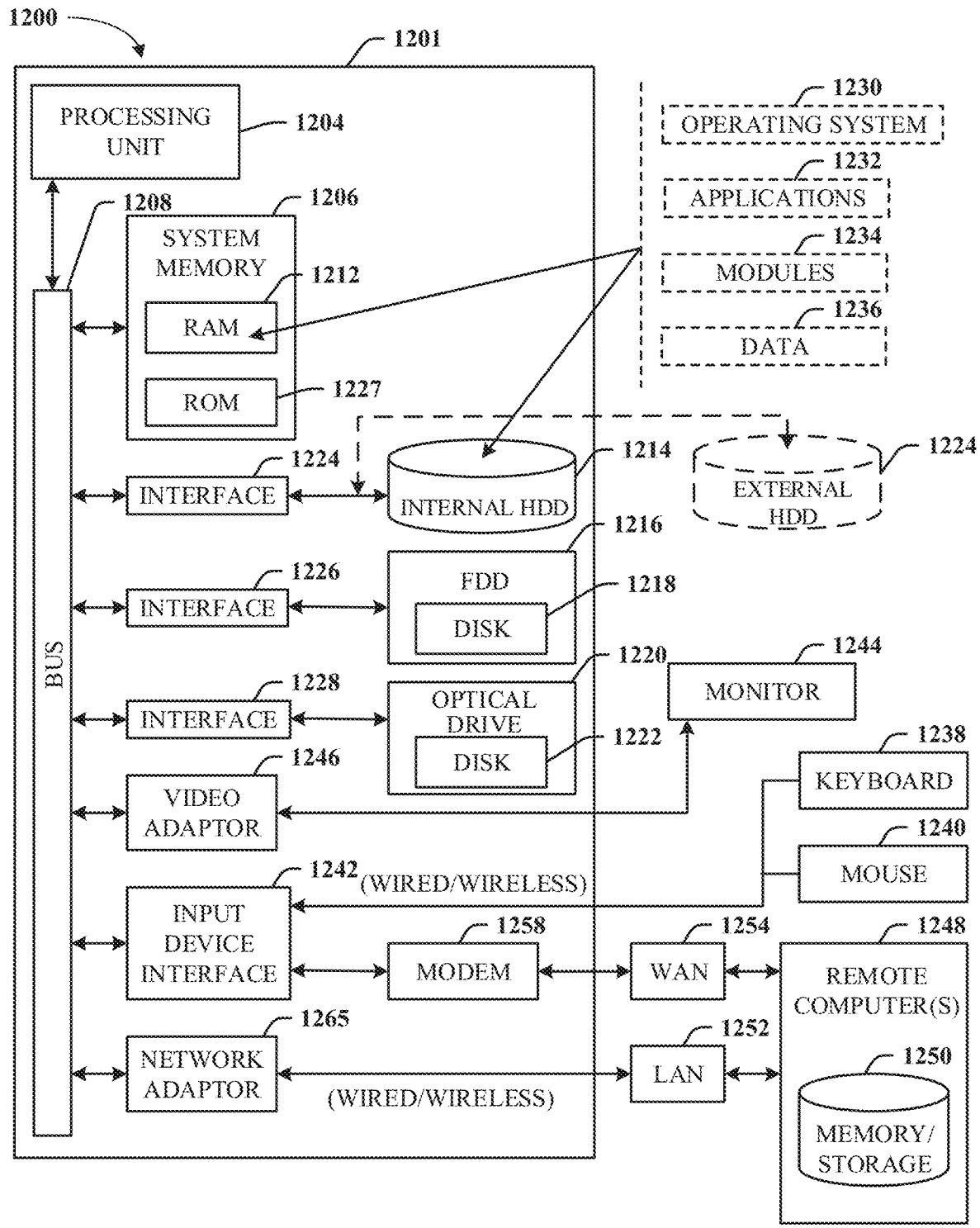
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Mobile transport connectivity design (e.g., switched Ethernet, dedicated Ethernet, DWDM, etc.), is a major challenge for automation of service path design that can have significant cost investment and long lead times to develop automation within monolithic network management applications. Support for various use cases and continuous changes within a monolithic network management can be costly and require advanced planning. There are currently no available containerized cloud-based micro service tools that can provide a meta-data driven approach for automation of service path design with flexibility to support various DWDM use cases and add new use cases by meta-data.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by network equipment comprising a processor, first orchestration flow data representative of a first service flow of a service via a network;
   applying, by the network equipment, topology template data, representative of a topology, to the first orchestration flow data, wherein the topology template data comprises:
      device template data, representative of a node device, comprising small form factor pluggable transceiver data representative of a small formfactor pluggable transceiver of the node device, associated with the topology, and
      rules template data representative of a connectivity rule associated with a service path topology;
   in response to the applying of the topology template data to the first orchestration flow data and based on the small form factor pluggable transceiver data, generating, by the network equipment, second orchestration flow data representative of a second service flow of the service via the network; and
   in response to receiving the first orchestration flow data and generating the second orchestration flow data, receiving, by the network equipment, a request to instantiate a service template associated with the second service flow.

2. The method of claim 1, wherein the topology template data comprises use case data representative of a point-to-point topology use case.

3. The method of claim 2, wherein the first service flow is a macro orchestration service flow.

4. The method of claim 1, wherein the second service flow is a micro orchestration service flow.

5. The method of claim 1, wherein the device template data further comprises device component data representative of a port of the node device.

6. The method of claim 1, further comprising:
   in response to the generating, storing, by the network equipment, the second orchestration flow data for deployment of the second service flow at a later time.

7. The method of claim 1, further comprising:
   caching, by the network equipment, the device template data for use during the generating of the second orchestration flow data.

8. A system, comprising:
   a processor; and
   a memory that stores executable instructions that, when executed by the processor, facilitate performance of operations, comprising:
      receiving first orchestration flow data representative of a macro service flow of a service via a network;
      applying topology template data, representative of a topology, to the macro service flow, wherein the topology template data comprises:
         device template data representative of a node device associated with the topology, wherein the device template data comprises small-form factor pluggable transceiver data representative of a small-form factor pluggable transceiver of network equipment, and
         link template data representative of an endpoint connection;
      in response to the applying of the topology template data to the macro service flow and based on the device template data, generating second orchestration flow data representative of a micro service flow of the service via the network; and
      in response to receiving the first orchestration flow data and generating the second orchestration flow data, receiving a request to instantiate a service template associated with the micro service flow.

9. The system of claim 8, wherein the receiving comprises receiving the first orchestration flow data by a representational state transfer application program interface.

10. The system of claim 8, wherein the operations further comprise:
    receiving request data, representative of a request for the micro service flow, from a graphical user interface.

11. The system of claim 8, wherein the topology template data further comprises use case data representative of a hub-spoke topology use case.

12. The system of claim 11, wherein the operations further comprise:
    generating sequencing data associated with a sequence of the micro service flow.

13. The system of claim 8, wherein the topology template data comprises multi-link segment data representative of a wavelength path associated with the micro service flow.

14. The system of claim 8, wherein the micro service flow is a first micro service flow, and wherein the operations further comprise:
    updating a second micro service flow based on the first micro service flow.

15. A non-transitory machine-readable medium, comprising executable instructions that, when executed by a processor, facilitate performance of operations, comprising:
    receiving first orchestration flow data representative of a first service flow;
    applying a topology template associated with a second service flow, to the first service flow, wherein the topology template comprises:
       rules template data representative of a connectivity rule associated with the second service flow,
       device template data, representative of a node device, comprising small form-factor pluggable transceiver data representative of a small form-factor pluggable transceiver of the node device, and
       link template data representative of an endpoint connection within the topology template;
    in response to the applying of the topology template to the first service flow and based on the small form-factor pluggable transceiver data, generating second orchestration flow data representative of the second service flow; and
    in response to receiving the first orchestration flow data and generating the second orchestration flow data, receiving a request to instantiate a service template associated with the second service flow.

16. The non-transitory machine-readable medium of claim 15, wherein the operations further comprise:
facilitating displaying the second service flow via a graphical user interface.

17. The non-transitory machine-readable medium of claim 16, wherein the operations further comprise:
facilitating editing the second service flow via the graphical user interface.

18. The non-transitory machine-readable medium of claim 16, wherein the facilitating of the displaying comprises facilitating the displaying of the second service flow via a representational state transfer application program interface.

19. The non-transitory machine-readable medium of claim 15, wherein the topology template is associated with multi-link segment data representative of a path associated with the micro service flow.

20. The non-transitory machine-readable medium of claim 15, wherein the rules template data comprises fiber data associated with fiber for the second service flow.

* * * * *